(12) United States Patent
Schimmel (10) Patent No.: US 11,809,935 B2
(45) Date of Patent: Nov. 7, 2023

(54) DYNAMICALLY MODIFYING THE PRESENTATION OF AN E-LABEL

(71) Applicant: UNITED STATES POSTAL SERVICE, Washington, DC (US)

(72) Inventor: Todd M. Schimmel, Annandale, VA (US)

(73) Assignee: UNITED STATES POSTAL SERVICE, Washington, DC (US)

(*) Notice: Subject to any disclaimer, the term of this patent is extended or adjusted under 35 U.S.C. 154(b) by 46 days.

(21) Appl. No.: 17/061,890

(22) Filed: Oct. 2, 2020

(65) Prior Publication Data

US 2021/0103792 A1 Apr. 8, 2021

Related U.S. Application Data

(60) Provisional application No. 62/910,077, filed on Oct. 3, 2019.

(51) Int. Cl.
| | | |
|---|---|---|
| *G06K 19/077* | (2006.01) | |
| *G06K 19/07* | (2006.01) | |
| *G06Q 50/32* | (2012.01) | |
| *G06Q 10/0832* | (2023.01) | |

(52) U.S. Cl.
CPC ... *G06K 19/07758* (2013.01); *G06K 19/0717* (2013.01); *G06K 19/0719* (2013.01); *G06K 19/07707* (2013.01); *G06Q 10/0832* (2013.01); *G06Q 50/32* (2013.01)

(58) Field of Classification Search
CPC ......... G06K 19/07758; G06K 19/0717; G06K 19/0719; G06K 19/07707; G06K 19/06112; G06Q 10/0832; G06Q 50/32; G09F 3/208
See application file for complete search history.

(56) References Cited

U.S. PATENT DOCUMENTS

| | | | | |
|---|---|---|---|---|
| 4,277,071 A | * | 7/1981 | Birt | G11B 23/38 369/84 |
| 5,151,684 A | * | 9/1992 | Johnsen | G06K 19/07703 340/5.92 |
| 6,089,453 A | * | 7/2000 | Kayser | G06Q 30/06 235/378 |
| 6,724,318 B2 | * | 4/2004 | Goodwin, III | G01S 13/878 340/8.1 |
| 6,924,781 B1 | * | 8/2005 | Gelbman | G06F 3/1454 340/8.1 |
| 7,429,984 B2 | * | 9/2008 | Sweeney | G06F 3/147 345/211 |

(Continued)

OTHER PUBLICATIONS

Title page, copyright page, and pp. 401 & 1159 of Merriam-Webster's Collegiate Dictionary (Eleventh Edition, 2020 (original copyright 2003)) (4 pages total).

*Primary Examiner* — Daniel I Walsh
(74) *Attorney, Agent, or Firm* — MH2 TECHNOLOGY LAW GROUP, LLP (57) ABSTRACT

An electronic label (e-label) device that monitors situational data and displays an e-label. When the device detects an appearance modification event trigger based on the situational data, it modifies the appearance of the e-label being displayed by the e-label device, for example, by enlarging the machine-readable portion (e.g., barcode portion) of the displayed e-label. A related method and computer program product are also described.

20 Claims, 9 Drawing Sheets

(56) References Cited

U.S. PATENT DOCUMENTS

| | | | | |
|---|---|---|---|---|
| 7,636,029 | B1* | 12/2009 | Zhou | G07C 9/215 340/5.2 |
| 8,762,212 | B2* | 6/2014 | Falls | G06Q 20/203 705/22 |
| 9,911,138 | B2* | 3/2018 | Grabovski | G06Q 30/0268 |
| 10,078,003 | B2* | 9/2018 | Gurumohan | A47G 19/00 |
| 10,078,977 | B2* | 9/2018 | Atkinson | G09G 3/18 |
| 10,281,336 | B2* | 5/2019 | Hammond | G09G 3/344 |
| 10,438,105 | B2* | 10/2019 | Obukhov | G06K 19/0707 |
| 10,448,211 | B1* | 10/2019 | Shen | G06K 7/10366 |
| 10,706,749 | B1* | 7/2020 | White | G09F 3/204 |
| 2001/0024157 | A1* | 9/2001 | Hansmann | G08B 13/2417 340/10.41 |
| 2001/0054005 | A1* | 12/2001 | Hook | G09G 3/3629 705/20 |
| 2002/0109593 | A1* | 8/2002 | Swartzel | G06Q 10/087 340/572.1 |
| 2002/0139838 | A1* | 10/2002 | Goodwin, III | G06Q 30/06 235/375 |
| 2002/0139847 | A1* | 10/2002 | Goodwin, III | G06Q 30/06 235/383 |
| 2004/0050941 | A1* | 3/2004 | Hanyu | G09F 3/02 235/487 |
| 2004/0104901 | A1* | 6/2004 | Capurso | G06Q 20/201 345/204 |
| 2005/0030158 | A1* | 2/2005 | Schulmerich | G06F 3/1462 340/5.91 |
| 2005/0134461 | A1* | 6/2005 | Gelbman | G06K 17/00 340/572.8 |
| 2005/0206586 | A1* | 9/2005 | Capurso | G09F 9/35 345/50 |
| 2005/0247780 | A1* | 11/2005 | Lowry | G09F 3/208 235/383 |
| 2006/0261948 | A1* | 11/2006 | Czyszczewski | G06Q 10/08 340/572.1 |
| 2007/0181678 | A1* | 8/2007 | Nilsson | G06F 3/147 235/383 |
| 2007/0237906 | A1* | 10/2007 | Li | G02F 1/1334 428/1.2 |
| 2008/0314991 | A1* | 12/2008 | Gelbman | G06F 3/1454 235/492 |
| 2009/0045918 | A1* | 2/2009 | Droesler | G06K 19/0717 340/10.1 |
| 2009/0235106 | A1* | 9/2009 | Easton | G06F 1/26 713/340 |
| 2009/0273443 | A1* | 11/2009 | Nilsson | G06F 3/147 340/5.91 |
| 2010/0287057 | A1* | 11/2010 | Aihara | G06K 7/1095 705/16 |
| 2011/0062227 | A1* | 3/2011 | Bagai | B65D 5/4216 235/375 |
| 2011/0102144 | A1* | 5/2011 | Okina | G06Q 30/02 340/5.91 |
| 2013/0043979 | A1* | 2/2013 | Huang | G06F 3/147 340/10.1 |
| 2013/0126610 | A1* | 5/2013 | Aihara | G06Q 20/322 235/383 |
| 2013/0240616 | A1* | 9/2013 | Huang | G09G 5/22 235/375 |
| 2014/0201042 | A1* | 7/2014 | Meyer | G06Q 10/087 705/28 |
| 2014/0206292 | A1* | 7/2014 | Hung | G09F 3/204 455/66.1 |
| 2014/0372254 | A1* | 12/2014 | Aragane | G06Q 30/0631 705/26.61 |
| 2015/0088641 | A1* | 3/2015 | Aoki | G06Q 30/0251 705/14.49 |
| 2015/0110153 | A1* | 4/2015 | Hoblit | G06Q 10/087 374/141 |
| 2015/0301778 | A1* | 10/2015 | Lim | G06K 19/07758 361/679.21 |
| 2015/0317682 | A1* | 11/2015 | Kayser | G01G 19/42 705/14.55 |
| 2015/0341352 | A1* | 11/2015 | Jun | G06Q 30/0623 235/383 |
| 2015/0356610 | A1* | 12/2015 | Ponoth | G06Q 30/0261 705/14.58 |
| 2016/0005020 | A1* | 1/2016 | Fernando | G07G 1/14 705/21 |
| 2016/0048907 | A1* | 2/2016 | Park | G06T 1/0007 345/634 |
| 2016/0134930 | A1* | 5/2016 | Swafford | A47F 5/0068 725/80 |
| 2016/0156701 | A1* | 6/2016 | Robin | G06Q 10/087 709/219 |
| 2017/0103515 | A1* | 4/2017 | Hulth | G06Q 10/08 |
| 2017/0221040 | A1* | 8/2017 | Ringo | G07G 1/009 |
| 2017/0287025 | A1* | 10/2017 | Kim | G06Q 30/06 |
| 2018/0270734 | A1* | 9/2018 | Kalidoss | H04W 4/35 |
| 2018/0276603 | A1* | 9/2018 | Lewis | G06K 17/0022 |
| 2018/0300518 | A1* | 10/2018 | Burkhart | G06K 7/1404 |
| 2018/0308041 | A1* | 10/2018 | Sundholm | G06Q 50/28 |
| 2018/0373972 | A1* | 12/2018 | Obukhov | G06K 19/0707 |
| 2019/0012937 | A1* | 1/2019 | Sundholm | G09F 3/204 |
| 2019/0122086 | A1* | 4/2019 | Basu | G06Q 50/02 |
| 2019/0251408 | A1* | 8/2019 | Guan | G01J 5/34 |
| 2019/0282000 | A1* | 9/2019 | Swafford | A47F 10/02 |
| 2019/0303862 | A1* | 10/2019 | Bollinger | G06Q 10/0838 |
| 2019/0305829 | A1* | 10/2019 | Hueber | H04B 5/02 |
| 2019/0329955 | A1* | 10/2019 | Thompson | B65D 85/73 |
| 2020/0090016 | A1* | 3/2020 | Gill | G06K 19/07345 |
| 2020/0210553 | A1* | 7/2020 | Lin | G06F 21/6218 |
| 2020/0251022 | A1* | 8/2020 | Grant | G06F 3/147 |
| 2020/0251042 | A1* | 8/2020 | Wang | G09G 3/2092 |
| 2020/0286135 | A1* | 9/2020 | Matayoshi | G09F 3/204 |
| 2020/0311794 | A1* | 10/2020 | High | G06K 19/0723 |
| 2020/0335015 | A1* | 10/2020 | Okuma | G09G 3/2096 |
| 2020/0339354 | A1* | 10/2020 | Soto Arriaza | B65G 1/1375 |
| 2020/0394939 | A1* | 12/2020 | Seo | G09F 3/208 |
| 2020/0402429 | A1* | 12/2020 | Cho | G09F 3/208 |
| 2021/0026586 | A1* | 1/2021 | Hu | G06K 17/00 |
| 2021/0035529 | A1* | 2/2021 | Cheng | G09G 5/10 |
| 2021/0059088 | A1* | 2/2021 | Jacobsson | H05K 13/021 |
| 2021/0067744 | A1* | 3/2021 | Buibas | G06F 3/012 |
| 2021/0103792 | A1* | 4/2021 | Schimmel | G06K 19/07758 |
| 2021/0225134 | A1* | 7/2021 | Mori | G06Q 30/06 |
| 2021/0279501 | A1* | 9/2021 | Schimmel | G06V 20/00 |
| 2021/0304256 | A1* | 9/2021 | Ishida | G06Q 30/0268 |
| 2021/0326828 | A1* | 10/2021 | Enatsu | G06Q 20/208 |
| 2022/0000283 | A1* | 1/2022 | Swafford | A47F 5/0068 |
| 2022/0068230 | A1* | 3/2022 | Chang | G09G 3/3453 |
| 2022/0374185 | A1* | 11/2022 | Oosthoek | G06F 3/147 |
| 2023/0108921 | A1* | 4/2023 | Helmer | A61M 5/002 40/299.01 |
| 2023/0135277 | A1* | 5/2023 | Jiang | G01S 5/0036 342/451 |
| 2023/0252538 | A1* | 8/2023 | Howard | G07G 1/06 705/26.1 |

* cited by examiner

DYNAMICALLY MODIFYING THE PRESENTATION OF AN E-LABEL

CROSS-REFERENCE TO RELATED APPLICATIONS

This application claims the benefit of, and priority to, U.S. Provisional Patent Application 62/910,077, which was filed on Oct. 3, 2019, and is incorporated herein by reference in its entirety.

BACKGROUND

An electronic label (or "e-label") is a digital representation of a physical label and may be presented on an electronic display of an electronic device (e.g., a smart phone, a tablet, a dedicated device, etc.). E-labels may be used in place of physical or paper-based labels. An e-label may include a barcode, quick response (QR) code, or the like. E-labels may carry tracking information and a device presenting an e-label may be attached or mounted to an item or product to track the product. Additionally, or alternatively, e-labels may be used to carry ticketing information, pricing information, product information, and/or other types of information. E-labels may also include human-readable text and/or information that may be typically provided on a physical label (e.g., origin/destination addresses, digits representing a tracking number, contact information, etc.). Barcodes and/or other types of codes on an e-label may be scanned by a scanning device in order for the scanning device to interpret information associated with the e-label (e.g., a tracking number, ticket number, etc.).

SUMMARY

In one example aspect, a device for displaying an electronic label (e-label) is provided. The device may include a display screen that displays the e-label; one or more sensors configured to gather situational data associated with the device; and a logic circuit that is operably coupled to the display screen and the one or more sensors. The logic circuit is configured to detect an appearance modification event trigger based on the situational data from the one or more sensors and to modify an appearance of the e-label on the display screen in response to the appearance modification event trigger. The situational data includes at least one of: a location of the e-label device; accelerometer data from the e-label device; gyroscope data from the e-label device; electronic signature data of electronic signals received by the e-label device; and beacon signals received by the e-label device. The logic circuit is further configured to modify the appearance of the e-label by changing a size, a shape, or a position of one or more portions of the e-label. Detecting the appearance modification event trigger includes determining a particular appearance modification event trigger from among a plurality of appearance modification event triggers based on one or more values of the situational data. The logic circuit is configured to determine a set of appearance parameters based on the appearance modification event trigger that was detected and modify the appearance of the e-label includes modifying the appearance of the e-label based on the set of appearance parameters. The logic circuit is configured to determine a set of appearance parameters from among a plurality of sets of appearance parameters based on one or more values of the situational data, and modifying the appearance of the e-label includes modifying the appearance of the e-label based on the set appearance parameters. Modifying the appearance of the e-label includes modifying the appearance of one or more portions of the e-label, the one or more portions including at least one of a scanning portion and a narrative portion. Modifying the appearance of the e-label includes changing the appearance of the e-label between a scanning mode and a viewing mode. The logic circuit may include a microprocessor.

In another example aspect, a computer-implemented method implemented by an electronic label (e-label) device, the method includes: displaying, by the e-label device, an e-label; monitoring situational data associated with the e-label device; detecting an appearance modification event trigger based on the situational data; and modifying an appearance of the e-label being displayed by the e-label device in response to the appearance modification event trigger. The situational data includes at least one of: location of the e-label device; accelerometer data from the e-label device; gyroscope data from the e-label device; electronic signature data of electronic signals received by the e-label device; and beacon signals received by the e-label device. The method may further include modifying the appearance of the e-label with different sizes, shapes, or positions of one or more portions of the e-label. Detecting the appearance modification event trigger includes detecting a particular appearance modification event trigger from among a plurality of appearance modification event triggers based on one or more values of the situational data. The method may include determining a set of appearance parameters based on the appearance modification event trigger that was detected, and modifying the appearance of the e-label includes modifying the appearance of the e-label based on the set of appearance parameters. The method may include determining a set of appearance parameters from among a plurality of sets of appearance parameters based on one or more values of the situational data, and modifying the appearance of the e-label includes modifying the appearance of the e-label based on the set appearance parameters. Modifying the appearance of the e-label includes modifying the appearance of one or more portions of the e-label, the one or more portions including at least one of a scanning portion and a narrative portion. Modifying the appearance of the e-label includes changing the appearance of the e-label between a scanning mode and a viewing mode.

In another example aspect, a computer program product includes a computer readable storage medium having program instructions embodied therewith. The program instructions are executable by a computing device to cause the computing device to perform operations including: displaying, by the computing device, an electronic label (e-label); monitoring situational data associated with the computing device; detecting an appearance modification event trigger based on the situational data; and modifying an appearance of the e-label being displayed by the computing device. The situational data includes at least one of: location of the e-label device; accelerometer data from the e-label device; gyroscope data from the e-label device; electronic signature data of electronic signals received by the e-label device; and beacon signals received by the e-label device.

DETAILED DESCRIPTION

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

E-labels may be presented on an e-label presentation device (e.g., a dedicated device or a general-purpose computing device such as a smart phone, tablet, or the like). The e-label presentation device may be built-in, attached or mounted to an item, such as package for delivery, a product in a warehouse, a shipping or storage container, etc., and used for various purposes (e.g., for the purposes of tracking the item, providing information regarding the item, etc.). In some embodiments, an e-label may include a scannable, scanning, or otherwise machine-readable portion (e.g., a barcode, QR code, or the like), and may also include a human-readable or narrative portion having, (e.g., text, icons, and/or other types of human-readable descriptive information regarding the item). Additionally, or alternatively, an e-label may be an electronic ticket having a machine-readable scanning portion for scanning the ticket, as well as a human-readable narrative portion with descriptive information regarding the ticket. An electronic ticket may be used for an aircraft flight, a sporting event, a concert, or the like.

In some situations, the scanning portion of an e-label may be relatively small in relation to the total area of the e-label and/or to the total size of the display, such that sufficient room is made available to present the narrative portion. For example, the narrative portion may occupy a relatively larger portion of the display on the e-label presentation device so that an individual may more easily view or read the narrative portion. While such an arrangement of the scanning portion and the narrative portion makes it easier for individuals to view the narrative portion, the small scanning portion can make it difficult or impossible for a machine to read the scanning portion. Conversely, a larger scanning portion improves the ease, accuracy, and distance of imaging, scanning, or reading the e-label with a machine, such as a barcode scanner, but make viewing and reading the narrative portion more difficult for a human, especially in certain light or environmental conditions, such as bright sunlight, rain, or snow.

To address these and other issues with conventional labels, aspects of the present disclosure may dynamically adjust or modify the display of an e-label within an e-label presentation device. More specifically, aspects of the present disclosure may predict whether the e-label is to be scanned by a scanner device or viewed by an individual. Based on this prediction, the appearance of the e-label may be dynamically adjusted. For example, the scanning portion (e.g., barcode) of the e-label may be maximized or enlarged when the e-label is to be scanned by a machine, such as a scanner device. Similarly, the narrative portion of the e-label may be maximized or enlarged when the e-label is to be viewed by an individual user. In this way, the presentation of the e-label dynamically adjusts based on whether the e-label is being scanned, or physically viewed by an individual.

As described herein, the modification of the e-label's appearance within a display may be determined based on one or more criteria, triggering events, sensor data, and/or situational data associated with an e-label device. As an illustrative example, the scanning portion may be enlarged when the e-label presentation device is within a threshold distance of a scanner device (e.g., a triggering event has occurred as determined based on location determination systems, beacons, scanner device electronic signature strength, etc.). Additionally, or alternatively, the scanning portion may be enlarged when the e-label presentation device is oriented in a particular manner or direction. For example, some scanner devices may read a barcode off of an electronic display of an e-label presentation device when the e-label presentation device is facing downward and placed on the scanner device. Accordingly, if the e-label presentation device is facing downward (e.g., a triggering event has occurred as determined based on data from a gyroscope implemented by the e-label presentation device), the scanning portion may be enlarged, as the downward facing direction indicates that label is in a position to be scanned, rather than in a position to be physically read by an individual. As another example, a triggering event may be detected when the e-label presentation device identifies that e-label presentation device is being physically viewed (based on facial recognition techniques). Accordingly, the narrative portion may be enlarged. In some embodiments, a timeout function maybe implemented to restore the size of the scanning portion and the narrative portion to a default position after the e-label's appearance has been modified from a triggering event. As another example, a triggering event may be detected based on an acceleration and/or speed of the e-label presentation device (e.g., based on location determination data, accelerometer data, etc.).

In some embodiments, the size and arrangement of other portions may be modified (e.g., in addition to or instead of the scanning portion and the narrative portion). In some embodiments, any number of rules and/or criteria may be implemented to define the manner in which the presentation and/or appearance of an e-label is modified based on different triggering events and/or sensor data. In this way, the presentation and/or appearance of the e-label may be dynamically adjusted based on its current use.

As described herein, an "e-label" may include an electronic shipping or tracking label. Additionally, or alternatively, the e-label may include an electronic ticket, such as an electronic boarding pass, transportation ticket, event admissions ticket (e.g., sporting event, concert, movie, etc.), or the like. The techniques described herein may dynamically adjust, modify, or change the appearance and display of any type of e-label based on the occurrence of triggering events and various data values (e.g., location data, sensor data, etc.) satisfying criteria defining the triggering events.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

Figure 1A:
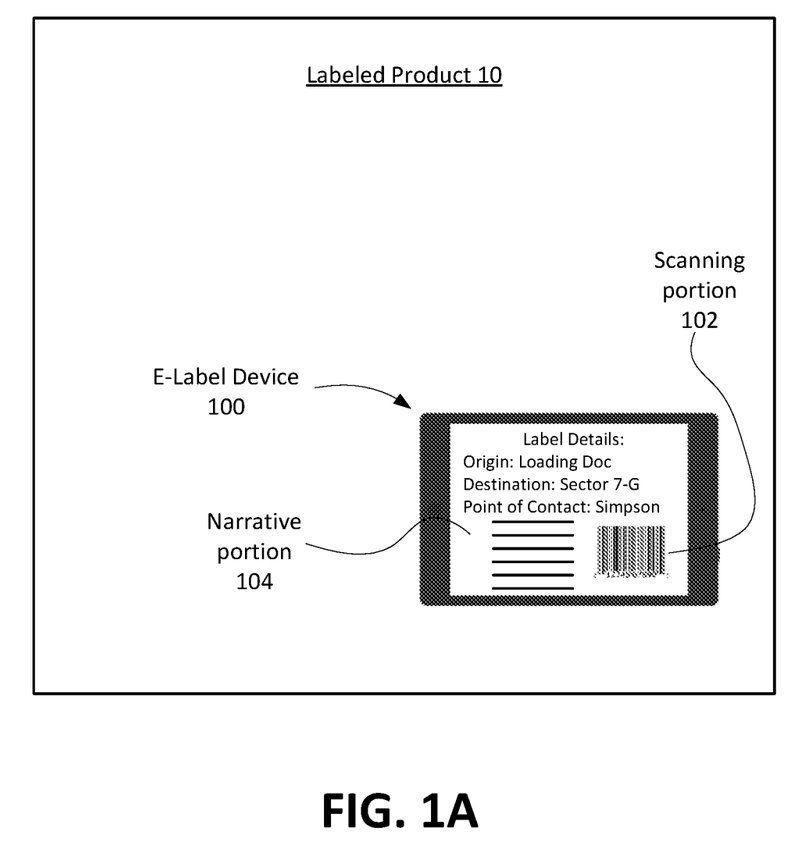
FIG. 1A shows an example of a delivery item with an e-label device in accordance with aspects of the present disclosure.
Figure 1B:
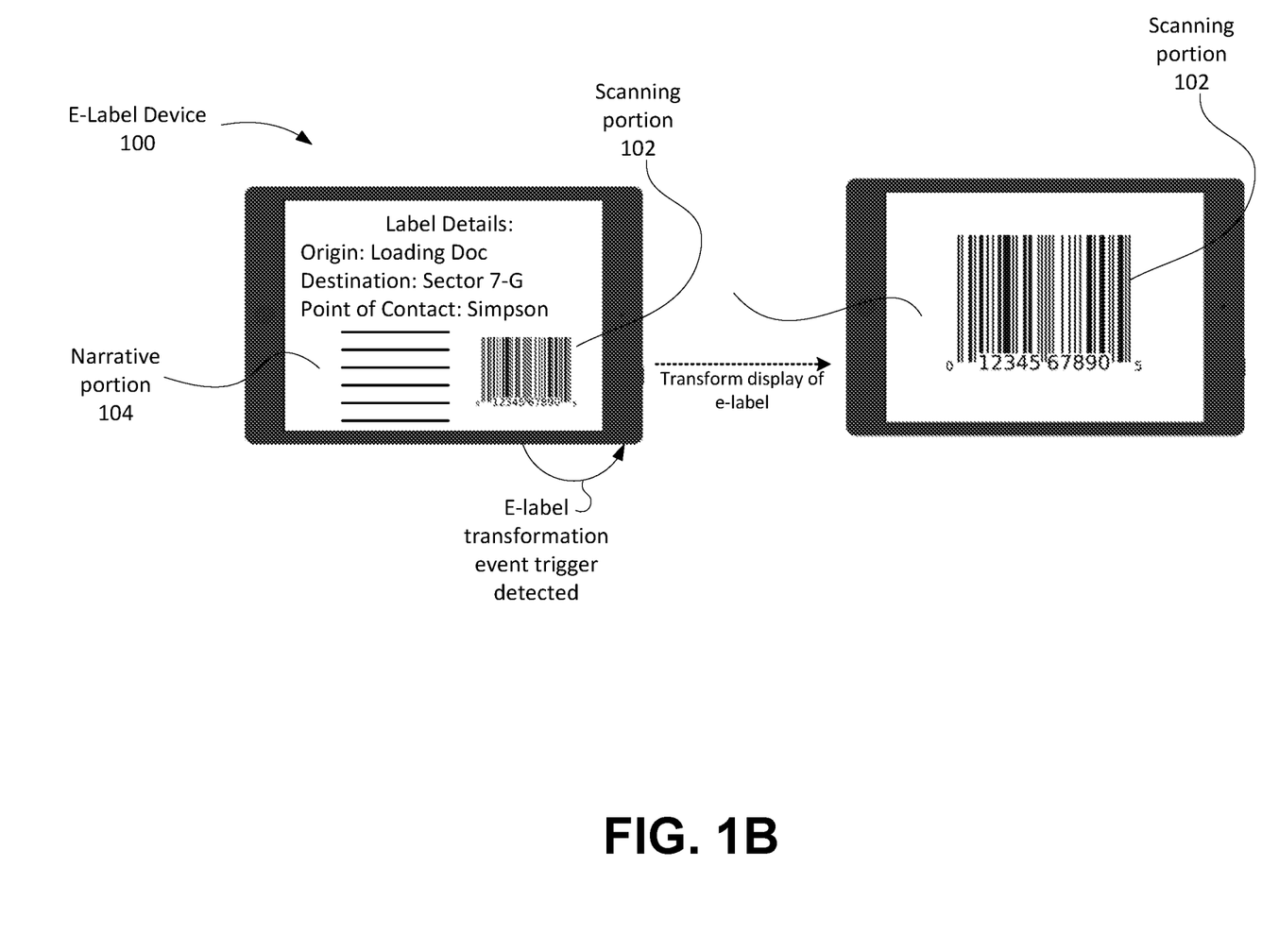
FIG. 1B shows an example of a device for dynamically displaying an e-label in accordance with aspects of the present disclosure.

FIGS. 1A and 1B show an overview of an example implementation in accordance with aspects of the present disclosure. As shown in FIG. 1A, a labeled product 10 may include an e-label device 100 mounted or attached to the labeled product 10. In some embodiments, the labeled product 10 may include an asset, a container, a computing device, a vehicle, and/or any other type of product suitable for being labeled by an attached e-label device 100. In some embodiments, the e-label device 100 may be attached to the labeled product 10 using any suitable mounting techniques (e.g., adhesives, locking tape, mounting hardware, snap-in hardware, etc.). In some embodiments, the e-label device 100 may display an e-label, which may include a scanning portion 102 and a narrative portion 104. As described herein, the display of the e-label may be modified or transformed based on the occurrence of different event triggers (e.g., when the labeled product 10 is moved to a scanning location for scanning the scanning portion 102). For example, the size, position, and/or arrangement of the scanning portion 102 and the narrative portion 104 may be modified. Additionally, or alternatively, either the scanning portion 102 or the labeled product 104 may be removed entirely.

Referring to FIG. 1B, the e-label device 100 may detect an e-label transformation event trigger based on conditions and/or data surrounding the e-label device 100. For example, the event trigger may be detected based on sensor data from sensors implemented by the e-label device 100, such as accelerometer data, gyroscope data, position data, camera data, etc. Additionally, or alternatively, the event trigger may be based on location data from communication with one or more beacons, GPS data, or the like. Additionally, or alternatively, the event trigger may be based on electronic signature data representing the presence of a scanning device. In general, an event trigger may define conditions and/or criteria indicating when the e-label is to be scanned by a scanner device (thus resulting in the labeled product 102 being enlarged), and when the e-label should may be physically viewed by an individual (thus resulting in the labeled product 104 being enlarged). As an illustrative example, an acceleration of the e-label device 100 beyond a threshold may indicate that the e-label device 100 is not being physically viewed and the labeled product 102 should be enlarged for scanning. As another example, detection of electronic signature signals consistent with an electronic scanner device may indicate that the e-label device 100 is near a scanner device and the labeled product 102 should be enlarged for scanning. Similarly, the electronic signature signals being no longer present (or when the signals are below a threshold) may indicate that the e-label device 100 is not near a scanner device and the labeled product 104 should be enlarged for easier viewing by an individual. As another example, location data may indicate that the e-label device 100 is near a scanner device and the labeled product 102 should be enlarged for scanning.

Upon the detection of an e-label transformation event trigger (e.g., by the e-label device 100), the presentation, display, and/or appearance of the e-label may be transformed. For example, the labeled product 104 may be removed and the labeled product 102 may be enlarged (e.g., such that a scanner may more effectively scan the pt102). As described herein, the e-label device 100 may restore the appearance of the e-label to a default appearance after a timeout period and/or after the conditions of the event trigger are no longer present. In general, the e-label device 100 may modify the presentation and appearance of the e-label based on any combination of rules, criteria, and situational data associated with the e-label device 100.

Figure 2:
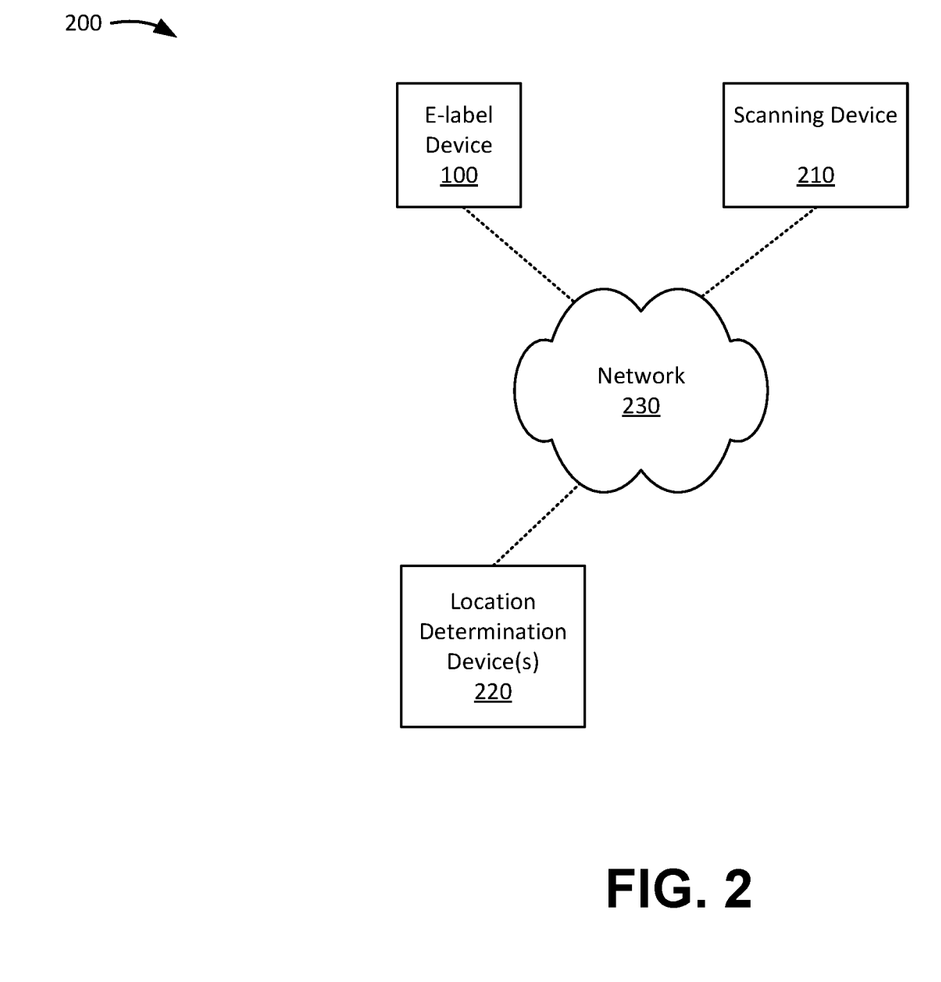
FIG. 2 shows an example environment as described herein.

FIG. 2 shows an example environment in accordance with aspects of the present disclosure. As shown in FIG. 2, environment 200 includes an e-label device 100, a scanning device 210, one or more location determination devices 220, and a network 230. In embodiments, one or more components in environment 200 may include the components of a device 700 described in greater detail with respect to FIG. 7.

The e-label device 100 may include a computing device having an electronic display for displaying and presenting an e-label. In example embodiments, the e-label device 100 may correspond to a mobile communication device (e.g., a smart phone or a personal digital assistant (PDA)), a portable computer device (e.g., a tablet computer), or the like. In some embodiments, the e-label device 100 may include one or more sensors, cameras, GPS components, and/or other hardware to acquire situational data, such as accelerometer data, position/orientation data from a gyroscope, location data, etc. As described herein, the e-label device 100 may include software to monitor the situational data, and adjust or change the display and appearance of an e-label based on changes in the situational data. In some embodiments, the e-label device 100 may communicate via the network 230, although network connectivity may not be necessary. In one or more alternative embodiments, the e-label device 100 may include circuitry that switches between e-label display modes based on various sensor readings.

The scanning device 210 may include a scanner to that may read and/or interpret a scanning portion 102 on an e-label displayed by the e-label device 100. In some embodiments, the scanning device 210 may be a standalone device, or may be a multipurpose device, such as a smart phone or tablet implementing a camera device to scan the labeled product 102.

The location determination devices 220 may include location beacons, or other types of devices that may aid the e-label device 100 in determination its location. In some embodiments, the location determination devices 220 may be placed near one or more scanning devices 210 such that the e-label device 100 can detect that the e-label device 100 is near a scanning device 210, and in turn, adjust or change the appearance of an e-label to improve scanning of the e-label. In some embodiments, the location determination device 220 may be integrated into the scanning device 210.

The network 230 may include network nodes and one or more wired and/or wireless networks. For example, the network 230 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 230 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
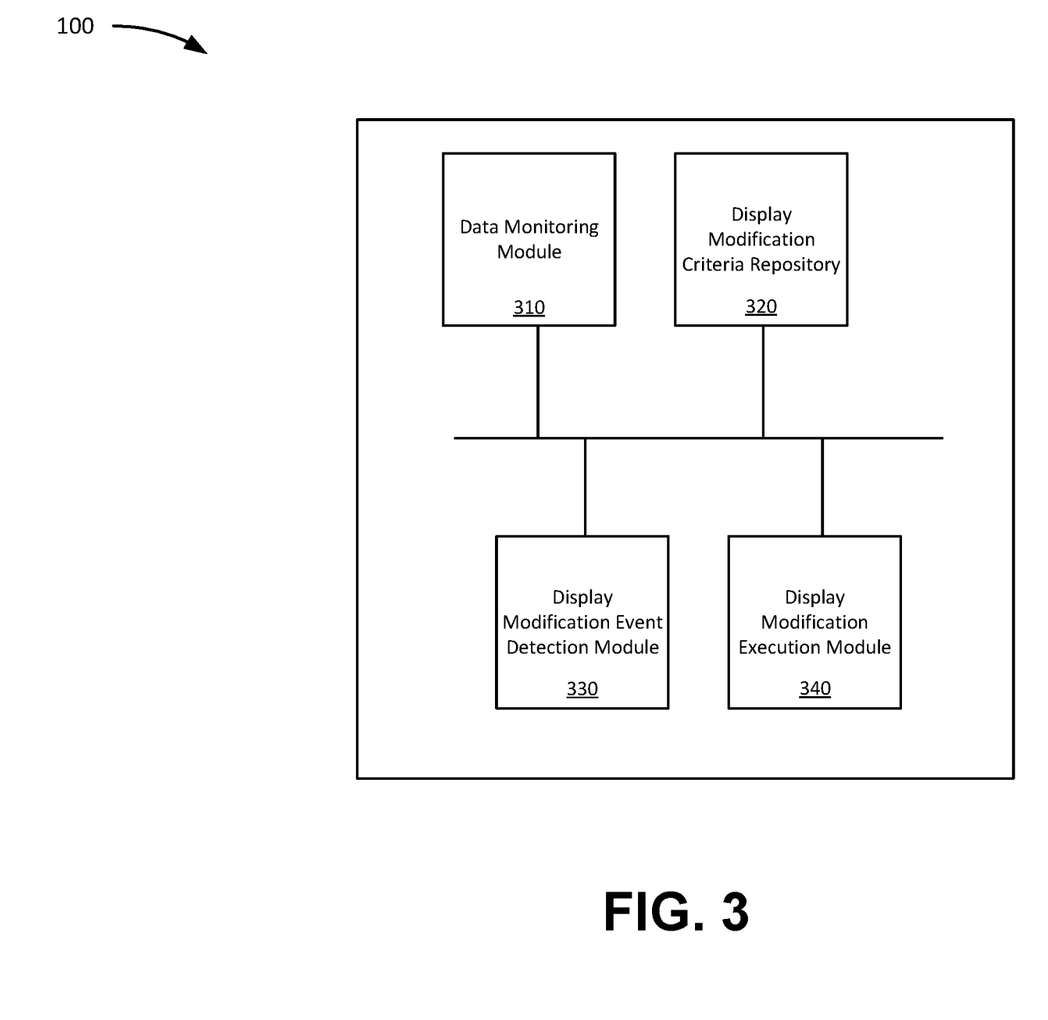
FIG. 3 shows a block diagram of example components of an e-label device in accordance with aspects of the present disclosure.

FIG. 3 shows a block diagram of example components of an e-label device in accordance with aspects of the present disclosure. As shown in FIG. 3, the e-label device 100 includes a data monitoring module 310, a display modification criteria repository 320, a display modification event detection module 330, and/or a display modification execution module 340. In embodiments, the e-label device 100 may include additional or fewer components than those shown in FIG. 3. In embodiments, separate components may be integrated into a single computing component or module. Additionally, or alternatively, a single component may be implemented as multiple computing components or modules.

In embodiments, the data monitoring module 310 may monitor a variety of situational data associated with the e-label device 100, such as sensor data, position data, location data, electronic signals and/or beacon signals received by the e-label device 100 or the like. As described herein, the situational data may indicate whether an e-label being presented by the e-label device 100 should be presented for scanning or for physical viewing. That is, the situational data may be used to determine the presentation and/or appearance of the e-label.

In embodiments, the display modification criteria repository 320 may store information defining different event triggers based on different data values (e.g., as monitored by the data monitoring module 310), and the appearance parameters of an e-label associated with each event trigger. As described herein, the appearance parameters may define how the e-label is to appear or be presented, such as the presence, size, position, and arrangement of the labeled product 102, the labeled product 104, and/or other portions, texts, graphics, etc. of the e-label. In general, criteria defining event triggers indicates situations in which the e-label is about to be scanned and the appearance of the labeled product 102 should be enlarged, versus when the e-label is to be physically viewed, and the appearance of the labeled product 104 should be enlarged (e.g., based on different situational data values).

As an illustrative example, the display modification criteria repository 320 may store criteria defining an event trigger based on gyroscope values corresponding to when the e-label device 100 is oriented or facing a particular direction (e.g., downward facing). Further, the criteria may indicate that, based on this event trigger, the labeled product 102 is to be enlarged or re-sized to a particular size, dimension, position, and/or location. For example, the display modification criteria repository 320 may store criteria to enlarge or re-size the labeled product 102 (and more specifically, a barcode) to a size of two inches by four inches, or to re-resize the barcode to the entirety of the display. As another example, the display modification criteria repository 320 may store criteria defining an event trigger based on accelerometer values of the e-label device 100 (e.g., as monitored by the data monitoring module 310) exceeding a threshold, and that the labeled product 102 should be enlarged or re-sized. As another example, the display modification criteria repository 320 may store criteria defining an event trigger based on location data values of the e-label device 100, and more specifically the e-label device 100 being located at particular location corresponding to the location of a scanning device 210. As another example, the display modification criteria repository 320 may store criteria defining an event trigger based on beacon signal values received by a beacon located at a scanning device 210. As another example, the display modification criteria repository 320 may store criteria defining an event trigger based on facial recognition data received from a camera device of the e-label device 100, indicating that user is viewing the e-label device 100 and that the labeled product 104 should be enlarged. As another example, the display modification criteria repository 320 may store criteria defining an event trigger based on the e-label device 100 receiving electronic signals consistent with the electronic signature of a scanner device 210. In general, the display modification criteria repository 320 may store any criteria defining any number of event triggers, and appearance parameters based on those event triggers. In some embodiments, the display modification criteria repository 320 may store criteria defining parameters of a default appearance of the e-label, and a timeout period in which the default appearance of the e-label is to be restored.

In some embodiments, the display modification event detection module 330 may detect an event trigger (e.g., a trigger for transforming, changing, or modifying the display or appearance of the e-label). For example, based on the situational data monitored by the data monitoring module 310, and the criteria defining the even triggers stored by the display modification criteria repository 320, the display modification event detection module 330 may detect when the situational data matches (e.g., to a threshold degree) the criteria of an event trigger. Further, the display modification event detection module 330 may identify the appearance parameters associated with the detected event trigger (e.g., based on the criteria stored by the display modification criteria repository 320).

In some embodiments, the display modification execution module 340 may execute a transformation or modification of the display of the e-label on the e-label device 100. For example, the display modification execution module 340 may transform the appearance of the e-label based on the detection of the event trigger (e.g., as detected by the display modification event detection module 330), and the appearance parameters associated with the event trigger (e.g., as defined by the criteria stored by the display modification criteria repository 320). In this way, the e-label device 100 may dynamically update, transform, change, and/or modify the appearance of the e-label based on whether the e-label is being scanned, or physically viewed by an individual. Also, the display modification execution module 340 may restore the appearance of the e-label to a default appearance after a timeout period.

Figure 4:
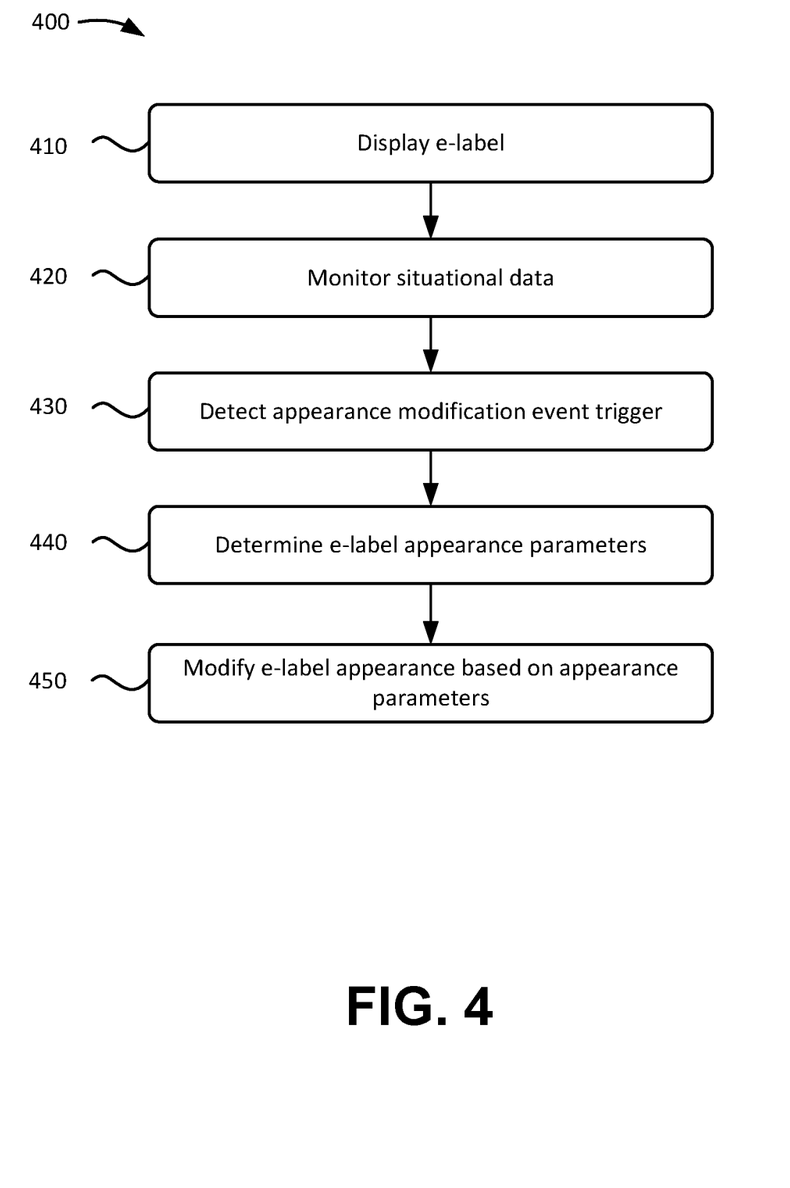
FIG. 4 shows an example flowchart of a process for dynamically modifying the e-label appearance based on changing situational data.

FIG. 4 shows an example flowchart of a process for dynamically modifying the e-label appearance based on changing situational data. The steps of FIG. 4 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present disclosure.

As shown in FIG. 4, process 400 may include displaying an e-label. For example, the e-label device 100 may display an e-label for any variety of purposes (e.g., tracking a product, allowing access to a ticketed event, etc.). In some embodiments, the e-label device 100 may display the e-label based on receiving a computer generated or manually user inputted instruction for displaying the e-label.

Process 400 may also include monitoring situational data (block 420). For example, as described above with respect to the data monitoring module 310, the e-label device 100 may monitor a variety of situational data, such as sensor data, position data, location data, electronic signals and/or beacon signals received by the e-label device 100 or the like.

Process 400 also includes detecting or determining the occurrence of an appearance modification event trigger (block 430). For example, as described above with respect to the display modification criteria repository 320 and the display modification event detection module 330, the e-label device 100 may detect an event trigger. More specifically, based on the situational data monitored by the data monitoring module 310, and the criteria defining the even triggers stored by the display modification criteria repository 320, the e-label device 100 may detect when the situational data matches (e.g., to a threshold degree) the criteria of an event trigger. In some embodiments, the e-label device 100 may detect a particular event trigger, of multiple different event triggers based on values of the situational data. For example, one set of values of situational data may correspond to one event trigger, whereas a different set of values may correspond to a different event trigger.

Process 400 further includes determining the e-label appearance parameters (block 440). For example, as described above with respect to the display modification criteria repository 320 and the display modification event detection module 330, the e-label device 100 may identify the appearance parameters associated with the detected event trigger (e.g., based on the criteria stored by the display modification criteria repository 320 associated with the particular event trigger detected at block 420). More specifically, the e-label device 100 may identify a particular set of appearance parameters associated with the particular event trigger detected at block 420, and the values of the situational data (e.g., monitored at block 410).

Process 400 also includes modify the e-label appearance based on appearance parameters (block 450). For example, as described above with respect to the display modification execution module 340, the e-label device 100 may execute a transformation or modification of the display of the e-label. For example, the e-label device 100 may transform the appearance of the e-label based on the detection of the event trigger (e.g., as detected at block 420), and the appearance parameters associated with the event trigger (e.g., as defined by the criteria stored by the display modification criteria repository 320 and determined at block 430). In this way, the e-label device 100 may dynamically update, transform, and/or modify the appearance of the e-label based on whether the e-label is being scanned, or physically viewed by an individual. Also, the e-label device 100 may restore the appearance of the e-label to a default appearance after a timeout period.

Figure 5:
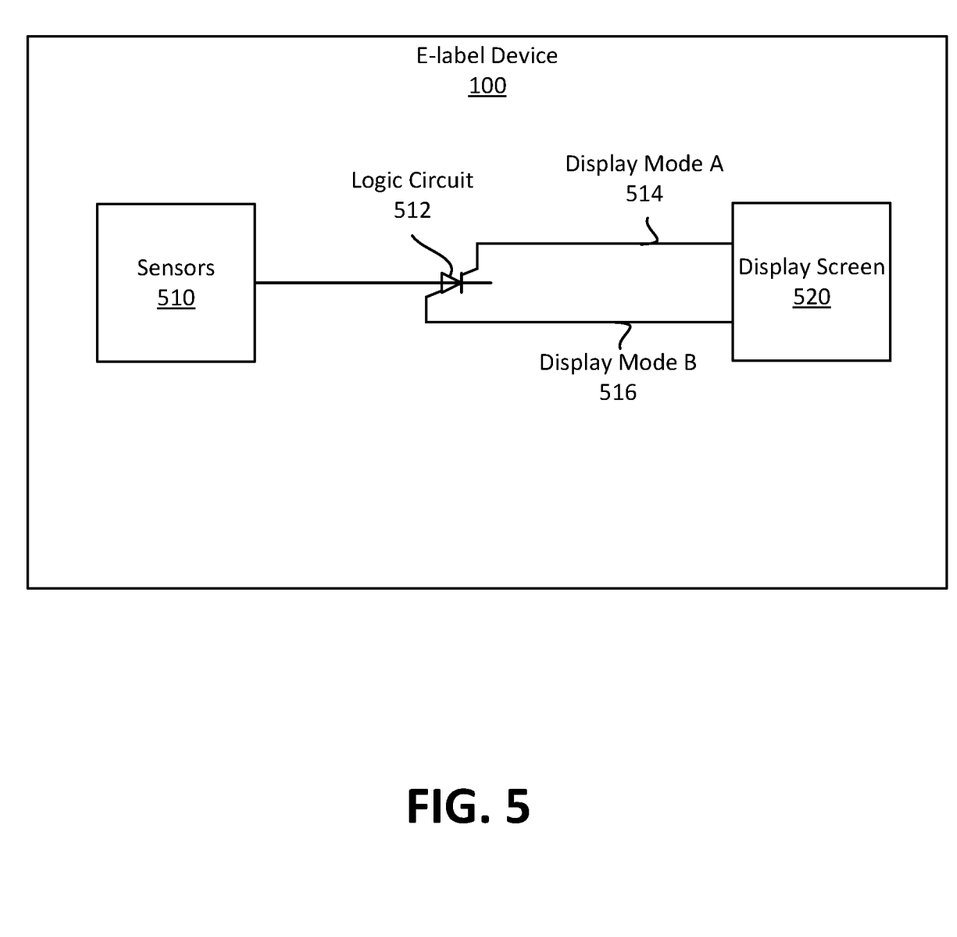
FIG. 5 illustrates an example of components of an e-label device in accordance with one or more embodiments of the present disclosure.

FIG. 5 illustrates an example of components of an e-label device in accordance with one or more embodiments of the present disclosure. As shown in FIG. 5, the e-label device 100 may include sensors 510, a logic circuit 512, and a display screen 520. In some embodiments, the logic circuit 512 may be a microprocessor and may selectively switch or toggle the display of an e-label, displayed by the e-label device 100, between two or more display modes. In the example of FIG. 5, the logic circuit 512 may selectively toggle between two display modes using the display mode A 514, and the display mode B 516, although in other embodiments, more than two display mode circuits may be implemented. In some embodiments, each display mode 514 and 516 may present the appearance of the e-label differently. For example, the display mode A 514 may present the e-label in a "scanning" mode in which a barcode, QR code, or other scannable element is re-sized, positioned, etc. such that the e-label is best presented for scanning by a scanning device 210. As another example, the display mode B may 516 may present the e-label in a "viewing" mode in which a narrative portion 104 is enlarged or re-sized, positioned, etc., such that the e-label is best presented for more optimal physical viewing.

In some embodiments, the logic circuit 512 may selectively switch between the display mode A 514 and the display mode B 516 based on different sensor readings, acquired by the sensors 510, satisfying configurable thresholds. For example, the logic circuit 512 may selectively switch between the display mode A 514 and the display mode B 516 based on accelerometer readings, gyroscope readings, electronic signature readings, etc. In some embodiments, the logic circuit 512 may execute process 400 in order to selectively switch between display modes. That is, the logic circuit 512 may detect an appearance modification event trigger based on situational data received from the sensors 510, and modify an appearance of the e-label on the display screen 520 in response to the appearance modification event trigger (e.g., in a similar manner as described with respect to process 400 of FIG. 4). In this way, the logic circuit 512 may modify the appearance of the e-label by modifying the e-label's size, shape, or positions of one or more portions of the e-label.

Figure 6A:
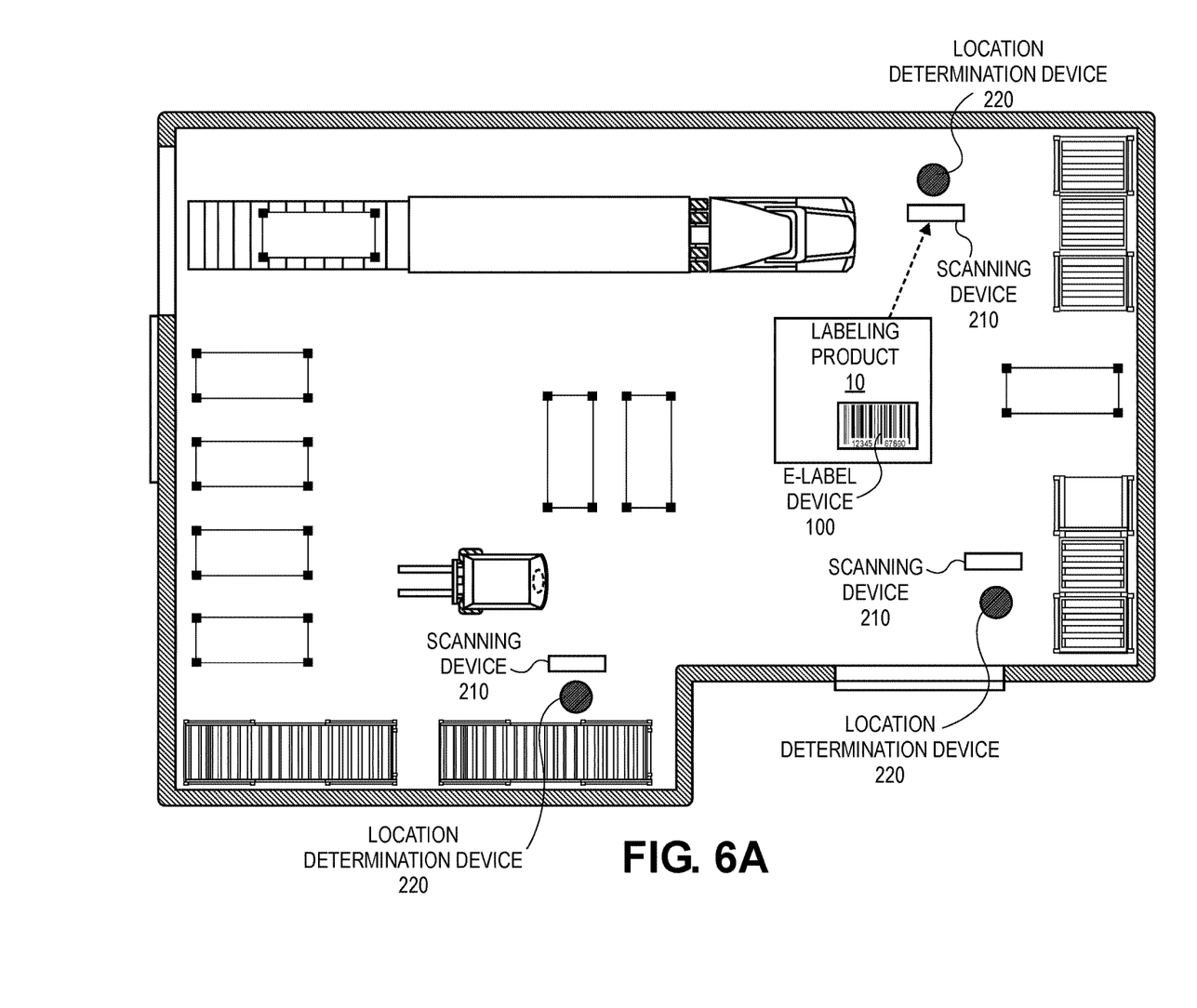
FIG. 6A illustrates the first part of an example use-case in accordance with aspects of the present disclosure.
Figure 6B:
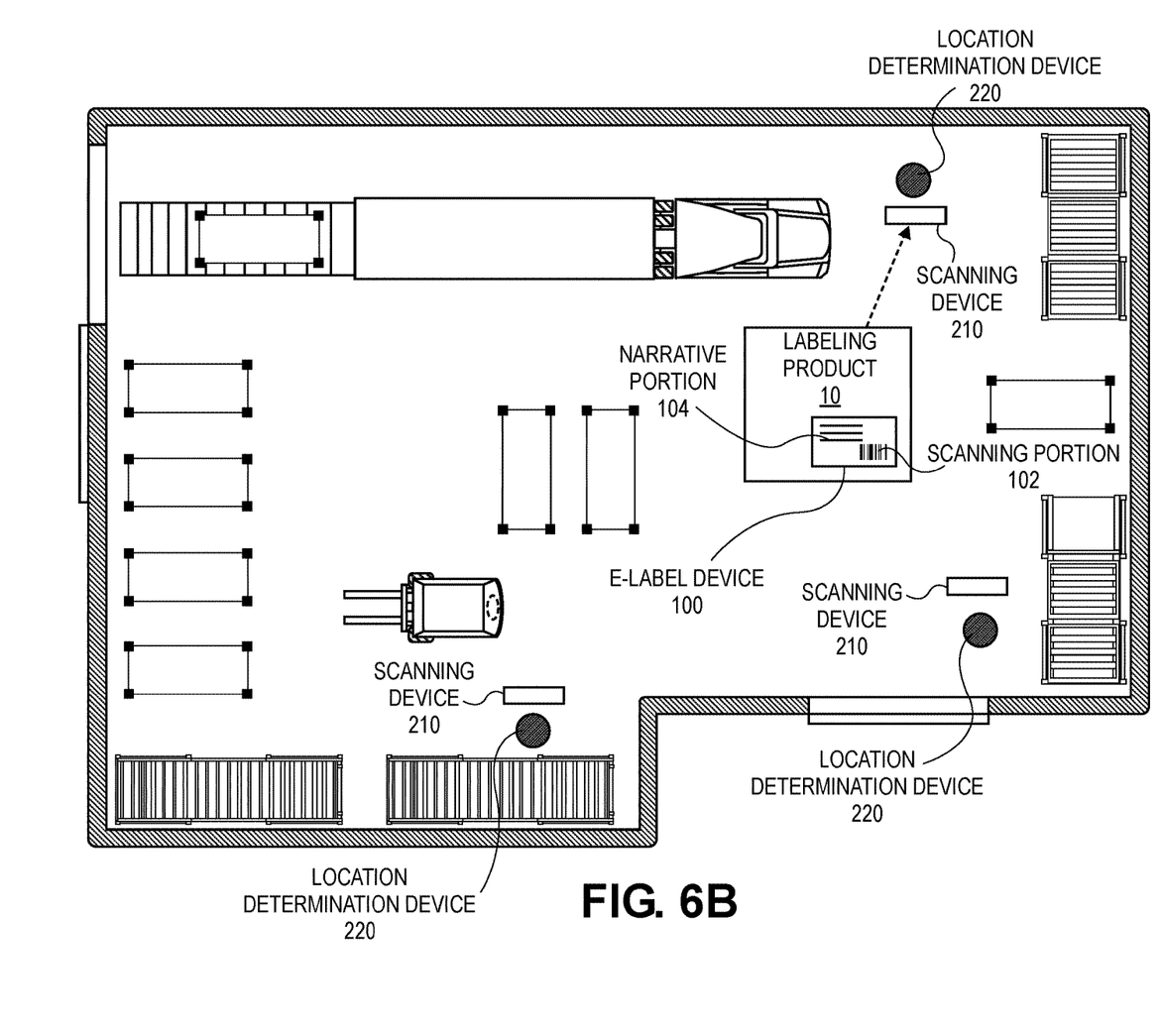
FIG. 6B illustrates the second part of an example use-case in accordance with aspects of the present disclosure.

FIGS. 6A and 6B illustrate an example use-case in accordance with aspects of the present disclosure. As shown in FIG. 6A, an e-label device 100 may be attached to a labeled product 10. As an illustrative example, the labeled product 10 may be in a warehouse facility, a data center facility, or the like. In the example of FIGS. 6A and 6B, scanning devices 210 may be distributed across the facility (e.g., for tracking the labeled product 10 within the facility). Each scanning device 210 may be co-located with a respective beacon or location determination device 220 (or each scanning device 210 may have an integrated location determination device 220). When the e-label device 100 moves to within a threshold proximity of the scanning device 210, the e-label device 100 may receive electronic signals (e.g., beacon signals) from the location determination device 220. The e-label device 100 may detect an event trigger when the strength of these electronic signals satisfies a threshold, and in turn, may re-size the appearance of a barcode included in the e-label presented by the e-label device 100. As an example, the e-label device 100 may resize the barcode to a dimension that is best suited for scanning by the scanning device 210. As described herein, the dimension of the barcode may be, for example, two inches by four inches, or may be configurable and stored within the display modification criteria repository 320.

Referring to FIG. 6B, the e-label device 100 may modify the appearance of the e-label when the e-label device 100 moves away from the location determination device 220 and the scanning device 210. For example, when the e-label device 100 moves a threshold distance away from the location determination device 220 (e.g., when the strength of electronic signals received by the location determination device 220 are less than a threshold value, or when the electronic signals are no longer received), the presentation of the e-label may be modified such that a narrative portion 104 is presented at a size and position suitable for physical viewing. As further shown in FIG. 6B, a scanning portion 102 may be present, but is re-sized such to accommodate space for presenting the narrative portion 104.

Figure 7:
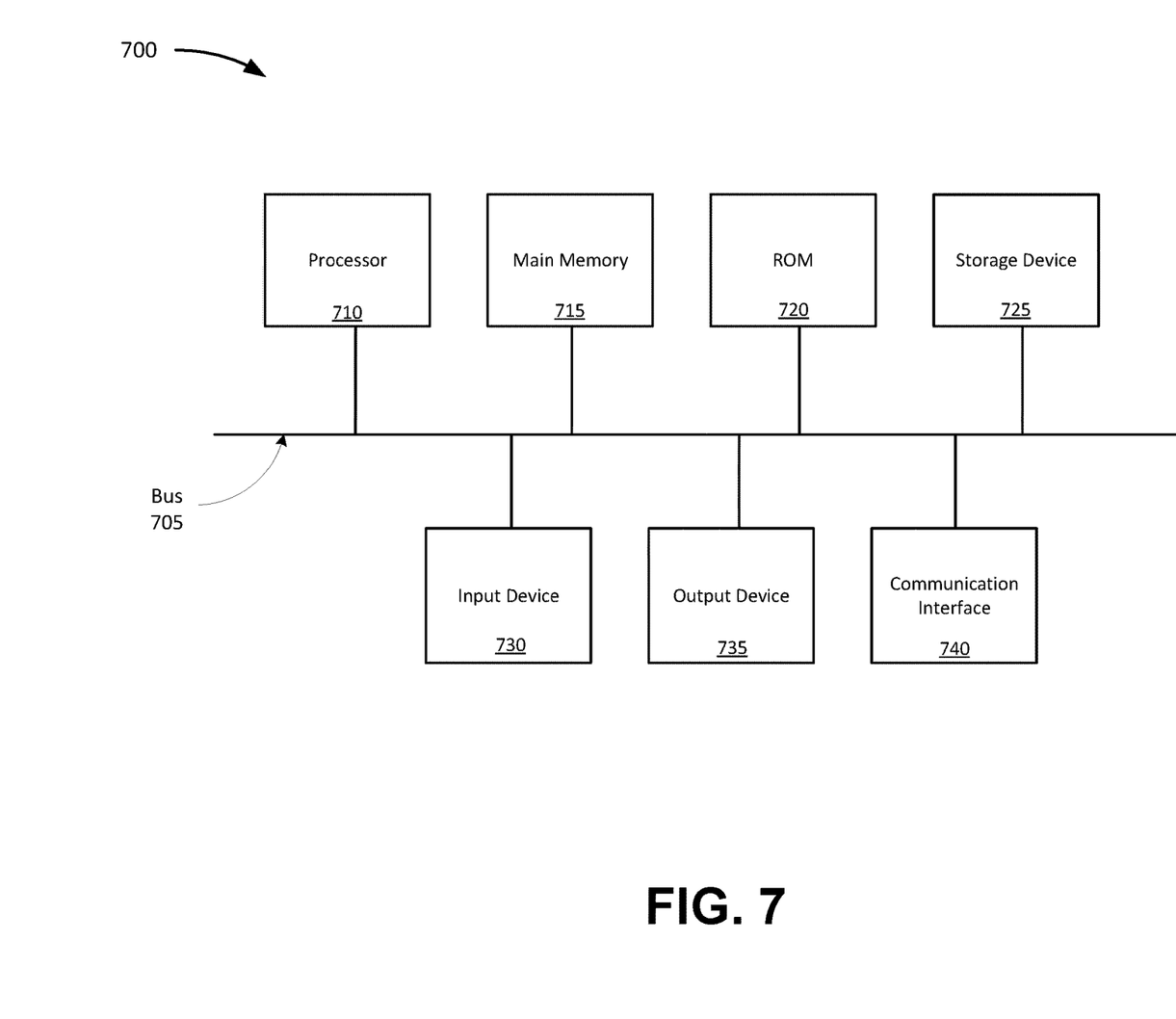
FIG. 7 illustrates example components of a device that may be used to implement one or more aspects of the present disclosure.

FIG. 7 illustrates example components of a device that may be used to implement one or more aspects of the present disclosure. Device 700 may correspond to e-label device 100, the scanning device 210, and/or the location determination device 220. Each of e-label device 100, the scanning device 210, and/or the location determination device 220 may include one or more devices 700 and/or one or more components of device 700.

As shown in FIG. 7, device 700 may include a bus 705, a processor 710, a main memory 715, a read only memory (ROM) 720, a storage device 725, an input device 730, an output device 735, and a communication interface 740.

Bus 705 may include a path that permits communication among the components of device 700. Processor 710 may include a processor, a microprocessor, an application specific integrated circuit (ASIC), a field programmable gate array (FPGA), or another type of processor that interprets and executes instructions. Main memory 715 may include a random access memory (RAM) or another type of dynamic storage device that stores information or instructions for execution by processor 710. ROM 720 may include a ROM device or another type of static storage device that stores static information or instructions for use by processor 710. Storage device 725 may include a magnetic storage medium, such as a hard disk drive, or a removable memory, such as a flash memory.

Input device 730 may include a component that permits an operator to input information to device 700, such as a control button, a keyboard, a keypad, or another type of input device. Output device 735 may include a component that outputs information to the operator, such as a light emitting diode (LED), a display, or another type of output device. Communication interface 740 may include any transceiver-like component that enables device 700 to communicate with other devices or networks. In some implementations, communication interface 740 may include a wireless interface, a wired interface, or a combination of a wireless interface and a wired interface. In embodiments, communication interface 740 may receiver computer readable program instructions from a network and may forward the computer readable program instructions for storage in a computer readable storage medium (e.g., storage device 725).

Device 700 may perform certain operations, as described in detail below. Device 700 may perform these operations in response to processor 710 executing software instructions contained in a computer-readable medium, such as main memory 715. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 715 from another computer-readable medium, such as storage device 725, or from another device via communication interface 740. The software instructions contained in main memory 715 may direct processor 710 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 700 may include additional components, fewer components, different components, or differently arranged components than are shown in FIG. 7.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A labeled product for displaying an electronic label (e-label), the labeled product comprising:
    a product; and
    an e-label device that is affixed to the product;
    wherein the e-label device includes:
        a display screen that displays the e-label for the labeled product;
        one or more sensors configured to gather situational data associated with the e-label device, the situational data associated with the e-label device comprising electronic signature data of electronic signals of an electronic external device identifying a type of electronic external device;
        a logic circuit that is operably coupled to the display screen and the one or more sensors; and
        a communication interface configured to receive location determination data associated with the electronic external device as the labeled product moves past the electronic external device;
    wherein the logic circuit is configured to:
        detect an appearance modification event trigger based on the situational data, which includes the electronic signature data, from the one or more sensors and based on the location determination data;
        identify the type of electronic external device based on the electronic signature data;
        determine an orientation of the product based on the situational data; and
        modify, based on the type of electronic external device and the orientation, an appearance of the e-label on the display screen in response to the appearance modification event trigger.

2. The labeled product of claim 1, wherein the situational data and the location determination data include at least one of:
    a location of the e-label device;
    accelerometer data from the e-label device;

gyroscope data from the e-label device; or beacon signals received by the e-label device, wherein the e-label device is configured to determine its location based on the beacon signals.

3. The labeled product of claim 1, wherein the logic circuit is further configured to modify the appearance of the e-label by changing a size, a shape, or a position of one or more portions of the e-label.

4. The labeled product of claim 1, wherein the logic circuit is further configured to detect the appearance modification event trigger by detecting a particular appearance modification event trigger from among a plurality of appearance modification event triggers based on one or more values of the situational data and based on the location determination data.

5. The labeled product of claim 4, wherein the logic circuit is configured to determine a set of appearance parameters based on the appearance modification event trigger that was detected, and wherein modifying the appearance of the e-label comprises modifying the appearance of the e-label based on the set of appearance parameters.

6. The labeled product of claim 1, wherein the logic circuit is configured to determine a set of appearance parameters from among a plurality of sets of appearance parameters based on one or more values of the situational data and based on the location determination data, and wherein the logic circuit is further configured to modify the appearance of the e-label by modifying the appearance of the e-label based on the set of appearance parameters.

7. The labeled product of claim 1, wherein the logic circuit is a microprocessor.

8. The labeled product of claim 1, wherein the appearance of the e-label on the display screen is modified by changing between a barcode and human readable text based on the type of electronic external device.

9. A method implemented by an electronic label (e-label) device affixed to a labeled product, the method comprising:

displaying, by the e-label device, an e-label;

monitoring situational data associated with the e-label device, the situational data associated with the e-label device comprising electronic signature data of electronic signals of an electronic external device identifying a type of electronic external device;

receiving location determination data associated with the electronic external device over a communication interface as the labeled product moves past the electronic external device;

detecting an appearance modification event trigger based on the situational data comprising the electronic signature data and based on the location determination data;

identifying the type of electronic external device based on the electronic signature data;

determining an orientation of the product based on the situational data; and modifying, based on the type of electronic external device, and the orientation, an appearance of the e-label being displayed by the e-label device by changing the appearance of the e-label in response to the appearance modification event trigger.

10. The method of claim 9, wherein the situational data and the location determination data include at least one of:

a location of the e-label device;

accelerometer data from the e-label device;

gyroscope data from the e-label device;

or beacon signals received by the e-label device enabling determination of a location of the e-label device.

11. The method of claim 9, wherein the modifying the appearance includes adjusting at least one of a size, a shape, or a position of one or more portions of the e-label.

12. The method of claim 9, wherein detecting the appearance modification event trigger comprises detecting a particular appearance modification event trigger from among a plurality of appearance modification event triggers based on one or more values of the situational data and based on the location determination data.

13. The method of claim 12, further comprising determining appearance parameters based on the appearance modification event trigger that was detected, and wherein modifying the appearance of the e-label comprises modifying the appearance of the e-label based on the appearance parameters.

14. The method of claim 9, further comprising determining a set of appearance parameters from among a plurality of sets of appearance parameters based on one or more values of the situational data and based on the location determination data, and wherein modifying the appearance of the e-label comprises modifying the appearance of the e-label based on the set of appearance parameters.

15. The method of claim 9, wherein modifying the appearance of the e-label comprises modifying the appearance of one or more portions of the e-label.

16. The method of claim 9, wherein the appearance of the e-label being displayed is modified by changing between a barcode and human readable text based on the type of electronic external device.

17. A computer program product comprising a non-transitory computer readable storage medium having program instructions embodied therewith, the program instructions executable by a computing device affixed to a labeled product to cause the computing device to perform operations comprising:

displaying, by the computing device, an electronic label (e-label);

monitoring situational data associated with the computing device, the situational data associated with the device comprising electronic signature data of electronic signals of an electronic external device identifying a type of electronic external device;

receiving location determination data associated with the electronic external device over a communication interface as the labeled product moves past the electronic external device;

detecting an appearance modification event trigger based on the situational data comprising the electronic signature data and based on the location determination data;

identifying the type of electronic external device based on the electronic signature data;

determining an orientation of the product based on the situational data; and modifying, based on the type of electronic external device, and the orientation, an appearance of the e-label being displayed by the computing device by changing the appearance of the e-label to a barcode, in response identifying the type of electronic external device as a scanner.

18. The computer program product of claim 17, wherein the situational data and the location determination data include at least one of:

a location of the computing device;

accelerometer data associated with the computing device;
gyroscope data associated with the computing device;
or beacon signals received by the computing device enabling self-determination of a location of the computing device.

19. The computer program product of claim 17, wherein the appearance of the e-label being displayed is modified by changing between the barcode and human readable text based on the type of electronic external device.

20. The computer program product of claim 17, wherein modifying, based on the type of electronic external device, the appearance of the e-label comprises modifying the appearance of the e-label by changing a size, a shape, or a position of one or more portions of the e-label.

* * * * *